United States Patent Office 3,625,070
Patented Dec. 7, 1971

3,625,070
CONTROL APPARATUS
David L. Paine, Minneapolis, Minn., assignor to
Honeywell Inc., Minneapolis, Minn.
Filed Oct. 17, 1969, Ser. No. 867,269
Int. Cl. G01c *19/28;* G01p *15/14*
U.S. Cl. 74—5.6                                          10 Claims

ABSTRACT OF THE DISCLOSURE

A single axis flueric attitude gyroscope having a spherical chamber adapted to contain a spinning fluid mass and circumferential nozzle means located on a great circle of the chamber for introducing fluid thereinto. The nozzle means comprises a central opening bounded by a pair of divergent opposite walls, each configured for attachment of fluid flow thereto, fluid flowing into the chamber at any point along the nozzle attaching to one of its walls depending on the direction of flow in the chamber adjacent that point, thereby sustaining rotation of the fluid mass about any spin axis lying in the plane of the great circle. Fluidic caging means and signal pickoff means is also provided.

BACKGROUND OF THE INVENTION

This invention pertains generally to instruments sensitive to angular displacement, and more specifically to flueric attitude gyroscopes.

An input function required in all aircraft flight control systems, and of potential utility in many other applications, is angular displacement from a known reference. In aircraft control systems, this parameter is used to provide an indication of heading, as well as indications of pitch and roll. In the past, a standard instrument for providing this information has been a gyroscope sensitive to such angular displacement. Such a gyroscope typically contains a spinning solid mass which provides an inertial reference from which to measure or sense displacement. More recently, it has been discovered that a spinning fluid mass can be established and sustained, and used to provide the inertial reference. Gyroscopes making use of a spinning fluid mass have the inherent potential advantages of low cost, simplicity, ruggedness, and long shelf life. These advantages make such instruments particularly applicable to many aircraft applications.

One of the problems encountered with prior art flueric gyroscopes (i.e., gyros including no moving mechanical parts) has been difficulty in reliably sustaining rotation of the spinning fluid mass without interfering with or causing drift of the fluid mass spin axis. The applicant's invention comprises an improved flueric gyro containing a novel driving nozzle which overcomes various problems encountered in prior art devices.

SUMMARY OF THE INVENTION

The applicant's improved flueric gyro basically comprises a housing enclosing a spherical chamber. An annular nozzle arrangement is located on a great circle of the chamber. The nozzle arrangement comprises a central circumferential inlet opening having divergent opposite walls, each configured for attachment of fluid flow thereto. Fluid flowing into the chamber through the central circumferential opening at any point therealong attaches to one of its walls depending on the direction of flow in the chamber adjacent that point, thereby sustaining rotation of the spinning fluid mass about any spin axis lying in the plane of the great circle.

Fins transverse to the central circumferential opening may be provided for preventing precession of the spin axis when the housing is pitched about an axis transverse to the sensitive axis of the gyroscope. An annular opening may be provided on each side of the central opening for exhausting fluid from the chamber. In addition, means may be provided for sensing the angular orientation of the housing relative to a reference coordinate system of which one axis is fixed with respect to the housing spin axis.

DESCRIPTION OF THE PREFERRED EMBODIMENT

Figure 1:
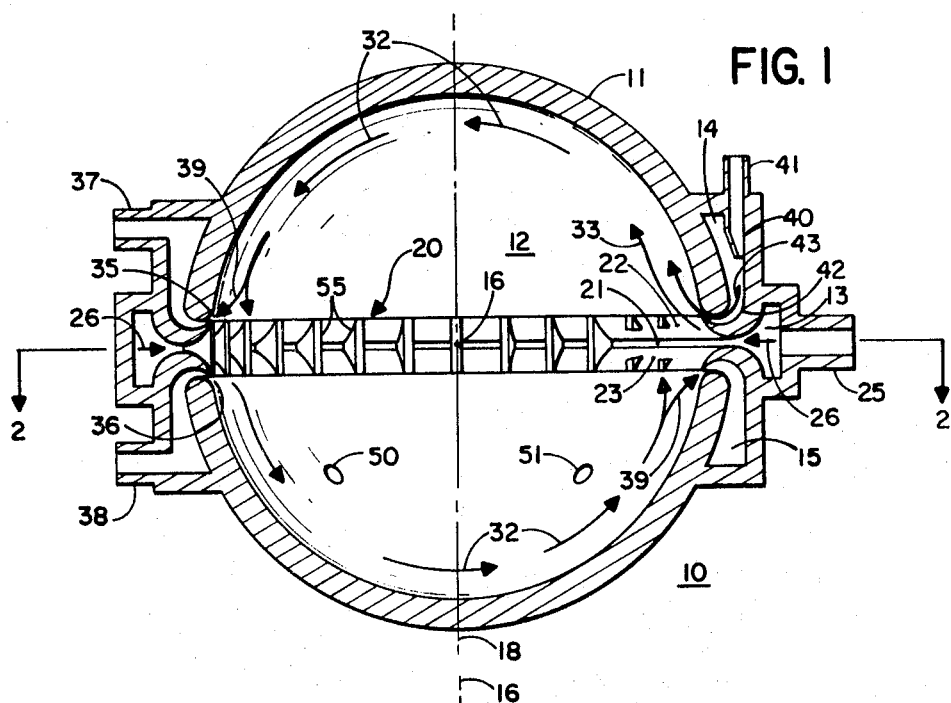
FIG. 1 is a cross-sectional view of a flueric gyro in accordance with the applicant's invention.
Figure 2:
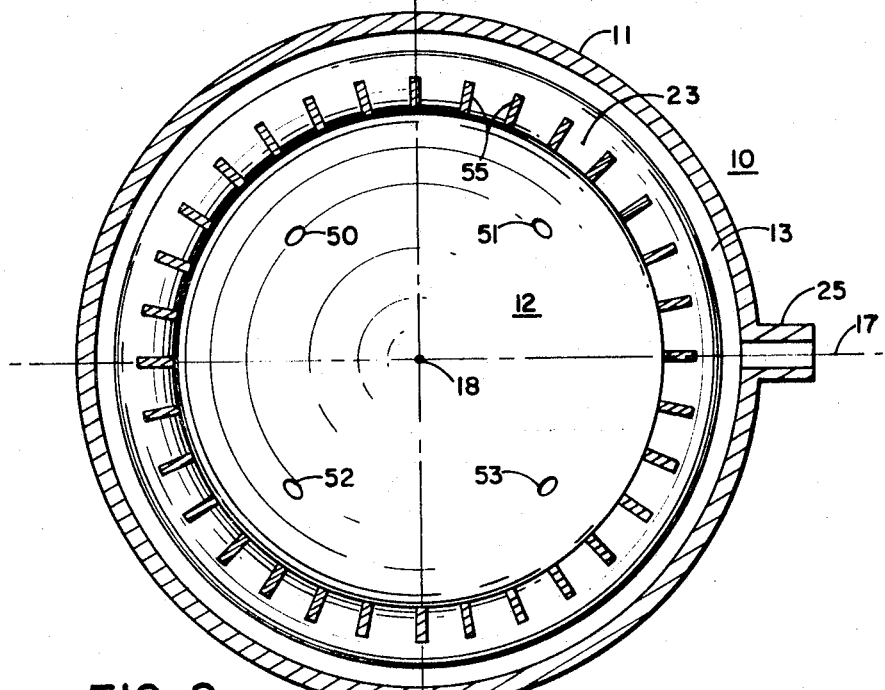
FIG. 2 is a cross-sectional view of the flueric gyro of FIG. 1 taken along lines 2—2.

In FIGS. 1 and 2, reference numeral 10 generally identifies a flueric gyroscope in accordance with the applicant's invention. Gyro 10 comprises a housing 11 enclosing a generally spherical chamber 12, a supply plenum 13 and a pair of exhaust plenums 14 and 15. First, second and third orthogonal axes identified by reference numerals 16, 17 and 18 intersect at the center of chamber 12 and define a coordinate system fixed with respect to housing 11. Annular nozzle means generally identified by reference numeral 20 is formed in housing 11 and surrounds chamber 12 on the great circle thereof lying in the plane containing axes 16 and 17. Annular nozzle means 20 comprises a central circumferential opening 21 bounded by a pair of walls 22 and 23 on opposite sides of the plane of the great circle and diverging inwardly with respect to chamber 12.

In operation, supply plenum 13 is supplied with fluid under pressure from a source (not shown) through an inlet fitting 25. Fluid flows from supply plenum 13 into chamber 12 around the entire circumference thereof through central opening 21 as indicated by arrows 26. Walls 22 and 23 are configured such that fluid flow into chamber 12 at any point along central opening 21 "attaches" to one or the other of the walls in accordance with the Coanda effect. At any point along central opening 21, the wall to which fluid flow attaches depends on the direction of flow in chamber 12 adjacent that point. Thus, once a spinning mass of fluid (schematically represented and identified by reference numeral 30 in FIG. 3) is established, rotation of the mass about an inertial spin axis identified as SA will be maintained. For purposes of the following description, fluid mass 30 can also be considered to have orthogonal axes 28 and 29 mutually perpendicular to spin axis SA. Axes SA, 28 and 29 define the reference coordinate system.

In FIG. 1, the fluid mass is indicated by arrows 32 as spinning about axis 16 in a counterclockwise direction. Thus, at all points to the right of the plane containing axes 16 and 18, the direction of fluid flow in chamber 12 adjacent opening 21 is upward past the opening. This flow pattern causes fluid entering chamber 12 through opening 21 to the right of the plane containing axes 16 and 18 to attach to wall 22 as indicated by arrow 33. Similarly, the direction of flow in chamber 12 to the left of the plane containing axes 16 and 18 is downward at all points along opening 21. Thus, fluid flow into chamber 12 to the left of this plane attaches to wall 23.

Figure 3:
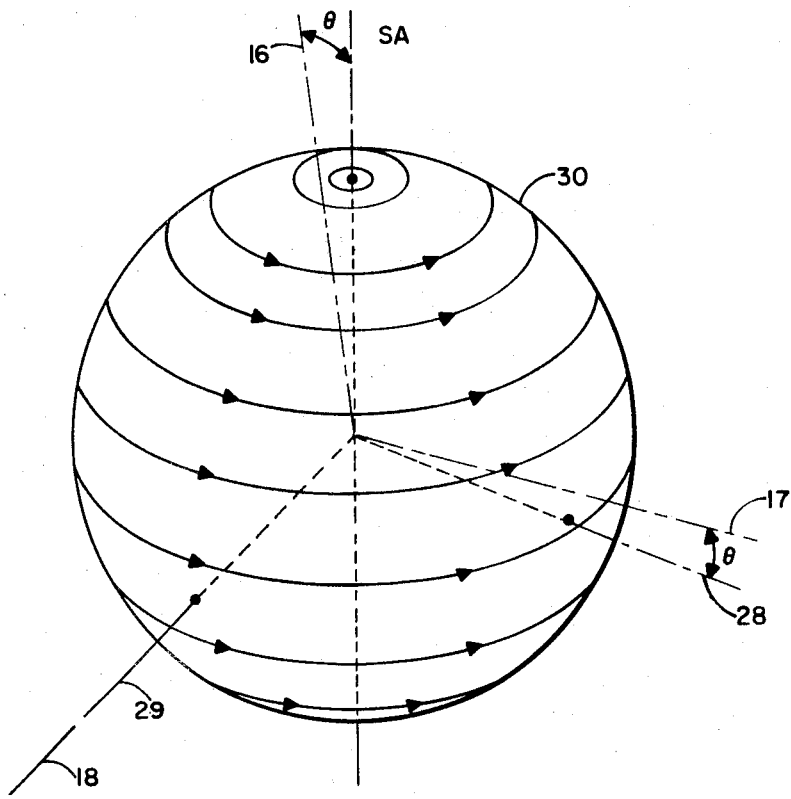
FIG. 3 is a schematic representation of the fluid mass or rotor utilized in the gyro of FIGS. 1 and 2.

It is pointed out that spin axis SA can assume any orientation with respect to housing 11 in the plane containing axes 16 and 17. Axis 29 of fluid mass 30 always coincides with axis 18. Further, due to the uniform symmetrical configuration of nozzle arrangement 20 about axis 18, it provides no preferred orientation of the spin axis. Thus, once a spinning fluid mass is established, thereby defining a spin axis, angular displacement θ (as indicated in FIG. 3) of housing 11 about axis 18 can be sensed to provide a displacement signal.

Fluid is removed from chamber 12 by means of a pair of circumferential openings 35 and 36 on opposite sides of central opening 21. Openings 35 and 36 communicate respectively with exhaust plenums 14 and 15 which are connected to a suitable fluid sink (not shown) through fittings 37 and 38. Arrows 39 represent the flow of fluid as it is removed from chamber 12.

A starter and caging jet 40 is provided for initially establishing rotation of flow about a spin axis having a known relationship to axes 16 and 17. In operation, starter and caging jet 40 is temporarily supplied with fluid from a fluid source (not shown) through a fitting 41. When supplied with fluid, jet 40 issues a fluid stream which follows a smoothly curved inner wall 42 of exhaust opening 35. Wall 42 is configured such that the fluid stream (indicated by reference numeral 43) enters chamber 12 substantially tangent to the surface thereof, thereby establishing a predetermined orientation of flow therein. It is pointed out that more than one such starter and caging jet may be employed. Normally, at least two such jets diametrically positioned with respect to chamber 12 are employed. Only one such jet is shown in FIG. 1 to simplify the disclosure of the applicant's invention.

One means of sensing the relative dislacement between spin axis SA and the coordinate system containing axes 16, 17 and 18 comprises a plurality of static pressure ports. Four such ports identified by reference numerals 50, 51, 52 and 53 are shown in FIGS. 1 and 2. Pairs of these pressure ports, as for example ports 50, 51 and ports 52, 53, may be connected to suitable pressure differential sensors (not shown). These pressure ports sense the pressure created by centrifugal forces in the spinning fluid mass. The location of the pressure ports is not critical and may be varied depending on the desired shape of the differential pressure output curve. The centrifugal pressure on the surface of a spinning spherical fluid mass is given by the following formula:

$$P = \tfrac{1}{2}\rho\omega^2 R^2 \cos^2 \phi$$

where P is pressure, $\rho$ is the fluid density, $\omega$ is the angular velocity, R is the radius of the mass and $\phi$ is the latitude of the point of interest on the mass. Thus, a change in radial distance of a pressure port from spin axis SA changes the pressure sensed by the pressure port.

When spin axis SA coincides with axis 16, pressure ports 50, 51, 52 and 53 all sense equal pressures because their radial distances from spin axis SA are equal. Rotating housing 11, and hence the housing coordinate system, about axis 18 through an angle θ causes ports 51 and 52 to move closer to spin axis SA. Similarly, ports 50 and 53 move further from spin axis SA. If the pressure ports are located at a latitudinal angle α relative to the normal equatorial plane of the mass, the resulting pressure differentials between ports 50, 51, and between ports 52, 53 are given by $P = \rho\omega^2 R^2 \cos^2(\alpha - \beta)$, where $\beta$ is the angle through which the ports move closer to or further from the equatorial plane. Assuming that axis 16 initially or normally coincides with spin axis SA, the angle $\beta$ is, of course, related to the angle θ (shown in FIG. 3) between axes 16 and SA. The above described method of sensing angular displacement of housing 11 with respect to spin axis SA is only exemplary. Other well known means also exist for sensing such displacements. The particular method employed depends on, among other things, the system in which the gyroscope is to be used.

FIGS. 1 and 2 show a plurality of fins 55 associated with nozzle arrangement 20. The purpose of these fins is to prevent precession of spin axis SA about axis 18 when gyroscope 10 is pitched about an axis transverse to axis 18. Fins 55 are equally spaced around the entire circumference of chamber 12. However, for purposes of clarity in describing opening 21 and bounding walls 22 and 23, certain of the fins have been broken away and others have been entirely delated from FIG. 1. Fins 55 lie in radial planes containing axis 18, and extend generally from the throat of opening 21 inward to its entrance into chamber 12. The configuration, number and spacing of fins 55 is chosen so as to provide minimum coupling between fluid mass 30 and housing 11 about axis 18. The configuration, number and spacing of fins 55 is also chosen so as to have the desired effect of preventing precession of spin axis SA as a result of angular displacements of housing 11 about an axis transverse to axis 18. Although fins are shown and described, it is pointed out that shallow slots in walls 22 and 23 can also be used for the same purpose.

In accordance with the foregoing discussion, it can be seen that the applicant has provided a novel fluid operated angular displacement sensor having no moving mechanical parts. The applicant's invention includes a unique circumferential drive nozzle capable of reliably sustaining rotation of a spinning fluid mass about any spin axis lying in the plane of the nozzle. Since there are no moving mechanical parts, the sensor has the inherent potential for simplicity, low cost, ruggedness, and reliability. Although one particular embodiment is shown in detail, it will be apparent to those skilled in the art that a variety of other structural details and modifications may be employed without departing from the teaching and contemplation of the applicant's invention.

I claim:

1. A pure fluid attitude sensor comprising:

a housing enclosing a spherical chamber having at its center the intersection of first, second and third orthogonal axes defining a housing coordinate system;

annular nozzle means located on the great circle of the chamber defined by the peripheral intersection therewith of the plane containing the first and second axes, said annular nozzle means extending continuously around the chamber along said great circle and having a uniform cross-sectional configuration in planes containing the third axis, said annular nozzle means comprising annular central opening means for introducing fluid into the chamber, the central opening means having divergent opposite walls, each configured for attachment of fluid flow thereto, said annular nozzle means further comprising an annular opening on each side of the central opening means for exhausting fluid from the chamber, fluid flowing into the chamber through the central opening means at any point therealong attaching to one of its walls depending on the direction of flow in the chamber adjacent that point, whereby a spinning fluid mass can be maintained in the chamber, the spin axis of the fluid mass capable of assuming any orientation in the plane containing the first and second axes; and means for sensing the orientation of the housing coordinate system relative to the spin axis.

2. The attitude sensor of claim 1 further including caging means for initiating rotation of fluid in the chamber about a spin axis fixed with respect to the housing coordinate system.

3. The attitude sensor of claim 2 wherein said caging means comprises means for establishing a fluid flow which is effective to cause fluid flowing into the chamber through at least a portion of the central opening means to attach to a predetermined wall thereof.

4. The attitude sensor of claim 2 wherein said caging means comprises at least one nozzle adapted to direct a fluid jet into the chamber substantially tangent to the surface thereof from at least one of the annular openings on opposite sides of the central opening.

5. In a fluid operated position sensor of the type comprising a housing enclosing a spherical chamber, means for introducing fluid into the chamber so as to produce a spinning fluid mass therein, means for removing fluid from the chamber, and means for sensing the orientation of the spin axis of the fluid mass, the improvement which comprises:

a single circumferential nozzle located on a great circle of the chamber and extending continuously around the chamber for introducing fluid thereinto, said inlet nozzle having a pair of walls on opposite sides of the plane of the great circle, said pair of walls diverging inwardly with respect to the chamber and configured for attachment of fluid flow thereto, said fluid flowing through said inlet nozzle at any point attaching to one of said pair of walls depending on the direction of flow in the chamber adjacent that point, whereby the spin axis can assume any orientation in the plane of the great circle.

6. The position sensor of claim 5 further including caging means for initiating rotation of fluid in the chamber about a spin axis fixed with respect to the housing.

7. The position sensor of claim 5 wherein the improvement further comprises a pair of circumferential exhaust outlets lying in planes on opposite sides of said circumferential nozzle.

8. The position of sensor of claim 7 further including caging means for initiating rotation of fluid in the chamber about a spin axis fixed with respect to the housing, said caging means comprising means for establishing a fluid flow which is effective to cause fluid flowing into the chamber through at least a portion of said circumferential nozzle to attach to a predetermined wall thereof.

9. The position sensor of claim 8 wherein said caging means comprises at least one nozzle adapted to direct a fluid jet into the chamber substantially tangent to the surface thereof from at least one of said circumferential exhaust outlets.

10. The position sensor of claim 5 wherein said circumferential nozzle is provided with a plurality of transverse fins equally spaced around the circumference of the chamber and lying in radial planes perpendicular to the plane of the great circle.

References Cited

UNITED STATES PATENTS

| | | | |
|---|---|---|---|
| 1,841,606 | 1/1932 | Kollsman | 73—515 X |
| 2,953,925 | 9/1960 | Yeadon | 74—5 X |
| 3,339,420 | 9/1967 | Paine | 74—5.7 X |
| 3,457,793 | 7/1969 | Evans | 74—5.1 |
| 3,509,778 | 5/1970 | Bowles | 74—5.6 |
| 3,516,280 | 6/1970 | Vandrey et al. | 74—5.7 |

MANUEL A. ANTONAKAS, Primary Examiner

U.S. Cl. X.R.

73—505; 74—5.7; 137—83